(12) United States Patent
Kurth (10) Patent No.: US 8,568,821 B2
(45) Date of Patent: Oct. 29, 2013

(54) APPARATUS AND METHOD FOR COATING EARS OF CORN

(75) Inventor: David Kurth, Grimes, IA (US)

(73) Assignee: Pioneer Hi Bred International Inc, Johnston, IA (US)

( * ) Notice: Subject to any disclaimer, the term of this patent is extended or adjusted under 35 U.S.C. 154(b) by 944 days.

(21) Appl. No.: 12/419,690

(22) Filed: Apr. 7, 2009

(65) Prior Publication Data
US 2009/0252880 A1 Oct. 8, 2009

Related U.S. Application Data

(60) Provisional application No. 61/043,219, filed on Apr. 8, 2008.

(51) Int. Cl.
*A01N 3/00* (2006.01)
*B05B 7/00* (2006.01)
*A01C 1/06* (2006.01)

(52) U.S. Cl.
USPC ............... 427/4; 118/300; 118/318; 118/319; 118/320; 47/57.6

(58) Field of Classification Search
USPC ......... 426/297, 302, 289, 520, 132, 231, 232; 427/4
See application file for complete search history.

(56) References Cited

U.S. PATENT DOCUMENTS

| | | | |
|---|---|---|---|
| 2,292,434 A * | 8/1942 | Di Cristina | 99/534 |
| 2,675,942 A | 4/1954 | Vogelsang | |
| 2,781,738 A * | 2/1957 | Paasche | 118/685 |
| 3,195,485 A | 7/1965 | Reynolds | |
| 3,415,352 A * | 12/1968 | Gerisch | 198/359 |
| 3,530,372 A | 9/1970 | Laukien | |
| 3,572,548 A | 3/1971 | Fuchs | |
| 3,636,486 A | 1/1972 | Ioffe et al. | |
| 3,884,347 A | 5/1975 | Gallagher et al. | |

(Continued)

FOREIGN PATENT DOCUMENTS

DE 196 16 216 A1 10/1997
EP 0 611 604 A2 8/1994

(Continued)

OTHER PUBLICATIONS

Pioneer Hi-Bred International, Inc., PCT/US2009/039725, International Search Report, Jun. 2, 2009, 4 pages.

(Continued)

*Primary Examiner* — Timothy Meeks
*Assistant Examiner* — Mandy Louie
(74) *Attorney, Agent, or Firm* — Pioneer Hi-Bred Int'l, Inc, (57) ABSTRACT

Apparatuses and methods for applying a coating to an ear of corn are disclosed. An enclosure having a user accessible workspace and a motor to turn an ear of corn therein to apply a coating to the ear of corn rotated by the motor is also disclosed. The method includes providing an enclosure with a user accessible workspace for housing a motor assembly having a motor with a grip, releasably securing the ear of corn to the grip, rotating the ear of corn with the motor, and spraying the coating on the ear of corn with the coating applicator associated with the workspace. Each ear of corn has an identifier to track and index the ear corn during coating and drying.

16 Claims, 7 Drawing Sheets

(56) References Cited

U.S. PATENT DOCUMENTS

| | | | |
|---|---|---|---|
| 3,993,788 A | 11/1976 | Longenecker | |
| 4,163,575 A * | 8/1979 | Riedinger et al. | 294/5 |
| 4,230,983 A | 10/1980 | Steere et al. | |
| 4,301,762 A | 11/1981 | Burnett, Jr. | |
| 4,413,014 A | 11/1983 | Melancon | |
| 4,602,716 A | 7/1986 | Barla-Szabo et al. | |
| 5,341,914 A | 8/1994 | DeMars et al. | |
| 5,677,474 A | 10/1997 | Rogers | |
| 6,299,368 B1 | 10/2001 | Tavularis | |
| 6,307,123 B1 | 10/2001 | Kriz et al. | |
| 6,537,826 B1 | 3/2003 | Horigane | |
| 6,705,827 B2 | 3/2004 | Keller et al. | |
| 6,706,989 B2 | 3/2004 | Hunter et al. | |
| 6,809,819 B1 | 10/2004 | Vinjamoori et al. | |
| 6,865,556 B2 | 3/2005 | Penner et al. | |
| 6,959,617 B2 | 11/2005 | Deppermann | |
| 7,044,306 B2 | 5/2006 | Deppermann et al. | |
| 7,067,834 B2 | 6/2006 | Horigane et al. | |
| 7,290,665 B2 | 11/2007 | Hunter et al. | |
| 7,367,155 B2 | 5/2008 | Kotyk et al. | |
| 7,502,113 B2 | 3/2009 | Deppermann et al. | |
| 7,588,151 B2 | 9/2009 | Hunter et al. | |
| 7,591,101 B2 | 9/2009 | Deppermann et al. | |
| 7,591,374 B2 | 9/2009 | Hunter et al. | |
| 7,600,642 B2 | 10/2009 | Deppermann et al. | |
| 7,611,842 B2 | 11/2009 | Deppermann et al. | |
| 7,685,768 B2 | 3/2010 | Deppermann et al. | |
| 7,703,238 B2 | 4/2010 | Deppermann et al. | |
| 7,767,883 B2 | 8/2010 | Deppermann et al. | |
| 7,830,516 B2 | 11/2010 | Deppermann et al. | |
| 7,832,143 B2 | 11/2010 | Deppermann et al. | |
| 7,849,632 B2 | 12/2010 | Deppermann et al. | |
| 7,877,926 B2 | 2/2011 | Deppermann et al. | |
| 7,905,050 B2 | 3/2011 | Hunter et al. | |
| 7,934,600 B2 | 5/2011 | Deppermann et al. | |
| 7,941,969 B2 | 5/2011 | Deppermann et al. | |
| 7,998,669 B2 | 8/2011 | Deppermann et al. | |
| 8,028,469 B2 | 10/2011 | Deppermann et al. | |
| 8,031,910 B2 | 10/2011 | Jones et al. | |
| 8,071,845 B2 | 12/2011 | Deppermann et al. | |
| 8,076,076 B2 | 12/2011 | Osborn et al. | |
| 8,245,439 B2 | 8/2012 | Deppermann et al. | |
| 8,281,935 B2 | 10/2012 | Deppermann et al. | |
| 2004/0131734 A1* | 7/2004 | Petcavich | 426/268 |
| 2004/0267457 A1 | 12/2004 | Timmis et al. | |
| 2006/0042527 A1 | 3/2006 | Deppermann | |
| 2006/0046244 A1 | 3/2006 | Deppermann et al. | |
| 2006/0222958 A1 | 10/2006 | Yamaguchi et al. | |
| 2007/0048872 A1 | 3/2007 | Deppermann et al. | |
| 2007/0207485 A1 | 9/2007 | Deppermann et al. | |
| 2007/0252006 A1* | 11/2007 | Heck et al. | 235/455 |
| 2008/0131254 A1 | 6/2008 | Cope et al. | |
| 2008/0131924 A1 | 6/2008 | Cope et al. | |
| 2009/0061449 A1 | 3/2009 | Chung et al. | |
| 2009/0142837 A1* | 6/2009 | Adams et al. | 435/441 |
| 2009/0155878 A1 | 6/2009 | Becker et al. | |
| 2009/0252880 A1 | 10/2009 | Kurth | |
| 2010/0044356 A1 | 2/2010 | Cope | |
| 2010/0086963 A1 | 4/2010 | Deppermann et al. | |
| 2010/0299790 A1 | 11/2010 | Deppermann et al. | |
| 2011/0081716 A1 | 4/2011 | Deppermann et al. | |
| 2011/0117570 A1 | 5/2011 | Cope et al. | |
| 2011/0129836 A1 | 6/2011 | Deppermann et al. | |
| 2011/0160068 A1 | 6/2011 | Becker et al. | |
| 2011/0217700 A1 | 9/2011 | Deppermann et al. | |
| 2011/0225680 A1 | 9/2011 | Cope | |
| 2011/0296930 A1 | 12/2011 | Deppermann et al. | |
| 2012/0079629 A1 | 3/2012 | Deppermann et al. | |
| 2012/0180386 A1 | 7/2012 | Deppermann et al. | |

FOREIGN PATENT DOCUMENTS

| | | |
|---|---|---|
| EP | 1 346 206 B1 | 9/2003 |
| EP | 1 391 713 A2 | 2/2004 |
| GB | 2 293 744 | 4/1996 |
| GB | 2 293 744 A | 4/1996 |
| KR | 10-1999-0022713 A | 10/1999 |
| KR | 10-2000-0022775 | 11/2001 |
| KR | 339689 B | 6/2002 |
| RU | 1805835 A3 | 3/1993 |
| RU | 2187919 C2 | 8/2002 |
| WO | WO 03/084847 A2 | 10/2003 |
| WO | WO 2006/022958 A1 | 3/2006 |
| WO | WO 2006/026466 A2 | 3/2006 |
| WO | WO 2006/026467 A2 | 3/2006 |
| WO | WO 2007/025250 A2 | 3/2007 |
| WO | WO 2007/103769 A2 | 9/2007 |
| WO | WO 2007/103786 A2 | 9/2007 |
| WO | WO-2007/103786 A2 | 9/2007 |
| WO | WO 2008/150798 A1 | 12/2008 |
| WO | WO-2008/150798 A1 | 12/2008 |
| WO | WO 2009/032741 A2 | 3/2009 |

OTHER PUBLICATIONS

International Search Report for International Appl. No. PCT/US2009/054652, mailed Mar. 31, 2010.

Aitken-Christie, J. et al., *Automation in Plant Tissue Culture*, Automation and Environmental Control in Plant tissue Culture (1995) 1-18.

Casady, W. W. et al., *An Automated Kernel Positioning device for Computer Vision Analysis of Grain*, American Society of Agricultural Engineers, vol. 32(5) (1989) 1821-1826.

Chunwongse, J. et al., *Pre-Germation Genotypic Screening Using PCR Amplification of Half-Seeds*, Theor Appl Genet, 86 (1993) 694-698.

Churchill, D. B. et al., *Rotating Table for Measuring Seed Physical Properties*, Transactions of the ASAE, vol. 34(4) (1991) 1842-1845.

Dekkers, J. C. M. et al., *The Use of Molecular Genetics in the Improvement of Agricultural Populations*, Nature Reviews | Genetics, vol. 3, (2002) 22-32.

Gasvoda, D. et al., *Whiteback Pine Seed Scarifier*, United States Department of Agriculture Food Service, Technology & Development Program, Timber Tech Tips, 0224-2332-MTDC (2002) pp. 1-6.

Hahnen, S. et al., *Automated DNA Preparation from Maize Tissues and Food Samples Suitable for Real-time PCR Detection of Native Genes*, European Food Research Technology, vol. 215 (2002) 443-446.

Higley, P.M., et al., *Effects of Non-Destructive Tissue Extraction on the Viability of Corn, Soybean and Bean Seeds*, Seed Sci. & Technol., 22 (1994) 245-252.

Horigane, A. et al., *Evaluation of Color Characteristics of Cross-Sectioned Wheat Kernels*, Food Sci. Technol. Res., 9:4 (2003), 327-331.

Horigane, A. et al., *Measurement of Brightness of Cross-Sectioned Wheat Kernels*, Japanese Journal of Crop Science, vol. 72, (attachment No. 1) (2003) 176-177.

Horigane, A. et al., *Two-Dimensional Analysis of Kernels Using a New Sample Preparation Method*, Chemistry and Biology, vol. 41, No. 6 (2003) 398-402.

Kamiya, M. et al., *Rapid DNA Extraction Method from Soybean Seeds*, Breeding Science 53 (2003) 277-279.

Kang, H.W. et al., *A Rapid DNA Extraction Method for RFLP and PCR Analysis from a Single Dry Seed*, Plant Molecular Biology Reporter, 16:90 (1998) 1pg.

Kerk, N.M. et al., *Laser Capture Microdissection of Cells from Plant Tissues*, Plant Physiology, vol. 132 (2003) 27-35.

Krysan, P., *Ice-Cap. A High-Throughput Method for Capturing Plant Tissue Samples for Genotype Analysis*, Plant Physiology, vol. 135 (2004) 1162-1169.

Liu, W. et al. *Highly Efficient Doubled-Haploid Production in Wheat via Induced Microsphere Embryogenesis*, Crop Science, vol. 42 (2002) 686-692.

McCarthy, P. L. et al., *Rapid Identification of Transformed Wheat Using a Half-Seed PCR Assay*, BioTechniques 32 (2002)560-564.

Pearson, T.C. et al., *Reduction of Aflatoxin and Fumonisin Contamination in Yellow Corn by High-Speed Dual-Wavelength Sorting*, Cereal Chem. 81(4), (2004) 490-498.

(56) References Cited

OTHER PUBLICATIONS

Peterhansel, C. et al., *Quantitative Detection of Transgenic and Endogenous DNA Sequences in Seeds After Automated DNA Preparation*, Biomed. Eng. Appl. Basis Commun. 16 (2004) 1-6.

Rafalkski, J. A., *Genetic Diagnostics in Plant Breading: RAPDs Microsatellites & Machines*, TIG, vol. 9, No. 8 (Aug. 1993) 275-280.

Sangtong, V. et al., *Serial Extraction of Endosperm Drillings (SEED)—A Method for Detecting Transgenes and Proteins in Single Viable Maize Kernels*, Plant Molecular Biology Reporter 19 (2001) 151-158.

Skinner, D. Z. et al., *Segregation and Conditioning Probability Association of Molecular Markers With Traits in Autotetraploid Alfalfa*, Molecular Breading, vol. 5 (2000) 295-306.

Smith, J. S. C. et al., *Genetic Purity and Testing Technologies for Seed Quality: A Company Perspective*, Seed Science Research 8 (1998) 285-293.

Sweeney, P. et al., *Random Amplified Polymorphic DNA Analysis of Dry Turfgrass Seed*, HortScience 31(3), (1996) 400-401.

Turner, N.A., et al., *Sampling and Analysis for Determining Relationship of Calcium Concentration to Bitter Pit in Apple Fruit*, New Zealand Journal of Vicultural Research 20:4 (1977) 525-532.

Von Post, R. et al., *A High-throughput DNA Extraction Method for Barley Seed*, Ettphytica, 130 (2003) 255-260.

Wang, G.L., et al., *PCR Amplification from Single Seeds, Facilitating DNA Marker-Assisted Breeding*, Nucleic Acids Research 21(10), (1993) 2527.

Wenxue, Z., et al., *PCR Analysis of Half-Seeds of Cereal Crops and Its Application in Marker-assisted Selection and Breeding*, Chinese Journal of Biotechnology, 12:4 (1997) 249-255.

Xu, Y., *Developing Marker-Assisted Selection Strategies for Breeding Hybrid Rice*, Plant Breeding Review, 23 (2003) 73-174.

Yang, W, et al., *A Preliminary Study of Non-Lethal Specific Sampling of Corn Embryo and Endosperm and Feasibility of Automating the Seed Selection Process Utilizing the Specific Sampling Technique*, Pioneer Hi-Bred (2002) 1-41.

Wang, J. et al., *Identification of Parents of F1 Hybrids Through SSR Profiling of Material and Hybrid Tissue*, Euphytica, vol. 124 (2002) 29-34.

Yao, Y. et al., *Single Kernel Sampling Method for Maize Starch Analysis While Maintaining Kernel Vitality*, Cereal Chem. 79:6 (2002) 757-762.

DuPont CoatingSolutions [onlin] [retrieved Apr. 4, 2013]. Retrieved from the Internet: <URL: www.ccaiweb.com/PDF/MembersOnly/annualpres08/DuPont CoatingSolutions—Corporate Member Presentation.pdf>. (undated) 12 pages.

200 watt CO2 laser from Synrad provieds the best cost per delivered watt available in today . . . [online] [retrieved Dec. 18, 2012]. Retrieved from the Internet: <URL: http://www.synrad.com/fseries/f201.htm>. (2011) 2 pages.

Skinner, D. Z. et al., *Segregation and Conditioning Probability Association of Molecular Markers With Traits in Autotetraploid Alfalfa*, Molecular Breeding, vol. 6 (2000) 295-306.

\* cited by examiner

```
                              ┌─ 84
TAKE COATING APPLICATOR 26 FROM COATING APPLICATOR CRADLE 70
AND COAT EAR OF CORN 44 FROM TOP TO BOTTOM AS MOTOR 16 SPINS
EAR OF CORN 44 ON ITS VERTICAL AXIS. TWO SWIPES UP AND DOWN MAY
BE SUFFICIENT TO EFFECTIVELY COAT EAR OF CORN 44 WITH COATING 96.
RETURN COATING APPLICATOR 26 TO COATING APPLICATOR CRADLE 70.
```

TURN RPM/DIRECTION ROTATION CONTROL 58 COUNTERCLOCKWISE UNTIL MOTOR 18 STOPS.

PUSH THE SCREW GUIDE UPWARD UNTIL IT REACHES THE STOP POSITION AND GRAB COATED EAR OF CORN 46 BY SCREW 98.

HANG EAR OF CORN 44 BY SCREW 98 ON MAGNET 68 AT DRYING POSITION 38 ON DRYING RACK 37. PLACE CORRESPONDING IDENTIFIER 40 NEXT TO COATED EAR OF CORN 46 ON THE CORRESPONDING IDENTIFIER POSITION 42 ON DRYING RACK 37.

ONCE 12 COATED EARS OF CORN 46 HAVE BEEN COMPLETED AND DRYING RACK 37 IS FULL THE FIRST 6 EARS MAY BE DRY ENOUGH TO BE PLACED BACK IN OR TAGGED WITH THEIR RESPECTIVE IDENTIFIERS 40 AND READY FOR SUBSEQUENT APPLICATIONS, SUCH AS BEING SHELLED EITHER MANUALLY OR MECHANICALLY.

TURN POWER OFF ON MOTOR CONTROL BOX 34 AND CLEAN COATING APPLICATOR 26 OF COATING 96.

*Fig. 5B*

APPARATUS AND METHOD FOR COATING EARS OF CORN

RELATED APPLICATIONS

This application claims priority under 35 U.S.C. §119 to U.S. Patent Application No. 61/043,219 filed Apr. 8, 2008, which application is hereby incorporated by reference in its entirety.

FIELD OF THE INVENTION

The present invention relates to apparatuses and methods for coating ears of corn, and particularly, apparatuses and methods for applying a magnetically active coating to the crown of corn kernels on an ear of corn.

BACKGROUND

The process of orienting seed corn for sampling purposes has been predominantly accomplished using manual techniques. Automatic orientation by magnetic attenuation is shown and described in U.S. application Ser. No. 11/939,380 filed Nov. 13, 2007 and Ser. No. 11/939,402 filed Nov. 13, 2007. Automatic orientation by magnetic attenuation has many advantages as described and set forth in the aforementioned applications. Thus, a need has been identified in the art for providing apparatuses and methods for applying a magnetically active coating in a medium to high throughput environment to an ear of corn to attract, position, orient, and secure kernels by magnetic attenuation.

Current apparatuses and methods for coating an ear of corn require the ear of corn to be handled extensively during the coating process. Therefore, a need in the art has been identified for providing apparatuses and methods for coating an ear of corn that does not require extensive handling in order to adequately coat ears of corn with a coating for use in subsequent applications facilitating handling of the individual kernels.

Magnetically active coatings, such as iron-based paints are inherently high-viscosity liquids. Due to viscosity, application of these coatings can be problematic. Therefore, a need has been identified in the art to provide apparatuses and methods to evenly coat an ear of corn with a magnetically active coating.

Coated ears of corn require time for drying before being handled or put within an envelope or other container for storing and identifying the ear of corn. Existing apparatuses and methods do not provide for tracking and indexing multiple ears of corn while drying. Therefore, a need has been identified in the art to provide an apparatus and method for drying multiple ears of corn for tracking, identifying, and indexing the ears of corn after being dried.

BRIEF SUMMARY OF THE INVENTION

Apparatuses and Methods for coating ears of corn are disclosed. According to one aspect, an apparatus for applying a coating to an ear of corn is disclosed. The apparatus includes a ventilated enclosure defining a user accessible workspace, a motor assembly within the workspace wherein the motor assembly includes a motor attached to a grip and the grip being adapted to releasably secure the ear of corn, and a coating applicator moveable within the workspace to apply the coating to the ear of corn rotated by the motor.

Methods for applying a coating to an ear of corn include providing an enclosure defining a user accessible workspace, housing a motor assembly having a motor connected to a grip, releasably securing the ear of corn to the grip, rotating the ear of corn with the motor, and spraying the coating on the ear of corn with a coating applicator associated with the workspace.

DETAILED DESCRIPTION

The following description is merely exemplary in nature and is not intended to limit the present disclosure, application, or uses.

For a better understanding of the invention, several exemplary embodiments will now be described in detail. Reference will be taken from time-to-time to the appended drawings. Reference numerals will be used to indicate certain parts or locations in the drawings. These same reference numerals will indicate the same parts or locations throughout the drawings, unless otherwise indicated.

Apparatus

Figure 1:
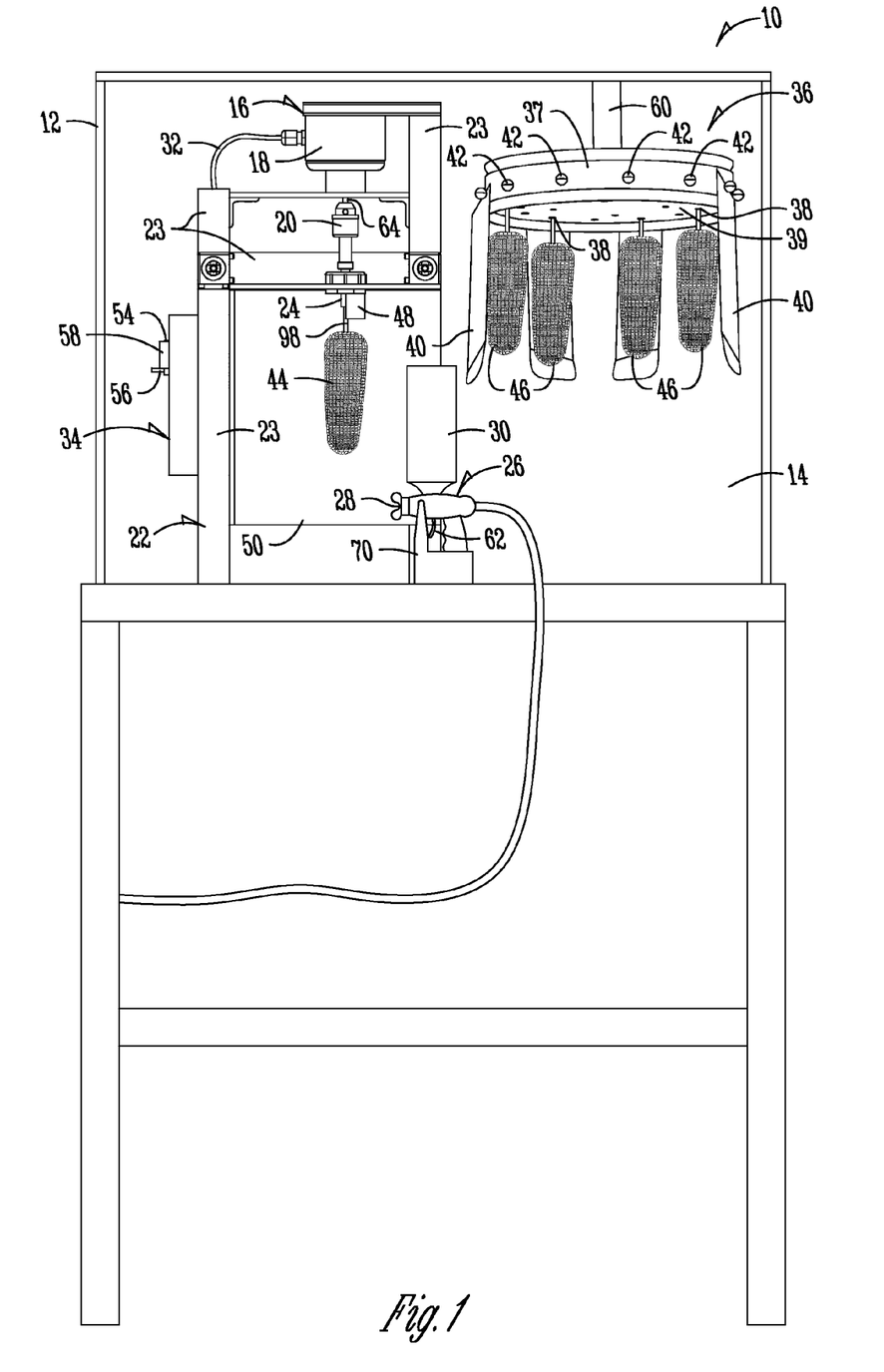
FIG. 1 is a front elevation view of an apparatus for applying a coating to an ear of corn according to an exemplary aspect of the present invention.

FIG. 1 is a perspective view of apparatus 10 for applying a coating to an ear of corn. Apparatus 10 includes enclosure 12. Enclosure 12 could be configured to be partially or fully enclosed. For example, if enclosure 12 is configured as fully enclosed access points could be configured into enclosure 12 to provide user access into enclosure 12. In one exemplary aspect, enclosure 12 may be configured with glove ports to allow access within enclosure 12. Enclosure 12 may also include one or more access points, for example, provided by a hinged door, to allow partial or full access to enclosure 12. Those skilled in the art can appreciate that enclosure 12 can be fully translucent or opaque depending upon preference. Enclosure 12 may be configured as a benchtop, countertop or standalone enclosure. Enclosure 12 could also be configured to be a ventilated enclosure. Those skilled in the art can appreciate that the concept of providing an enclosure for applying a coating to an ear of corn is not limited to only small enclosures. For example, enclosure 12 could be of a size sufficient to provide user accessible walk-in space. Enclosure 12 could be configured to house not only one or a few, but many, even possibly hundreds of ears of corn whereby each is coated simultaneously or consecutively within enclosure 12 by manual, semi-automated or fully-automated processes. Those familiar with high throughput processes should appreciate that the concepts set forth in the present invention are not limited, and as such, could be extended to facilitate not only low or medium throughput, but even high throughput ear coating processes.

The body of enclosure 12 defines a workspace 14 accessible by a user. The apparatuses for coating and drying an ear of corn may be fully or partially incorporated within workspace 14. For example, apparatuses used to coat or dry the ear of corn 44 could be on the exterior of enclosure 12 but contiguous to enclosure 12.

Figure 2A:
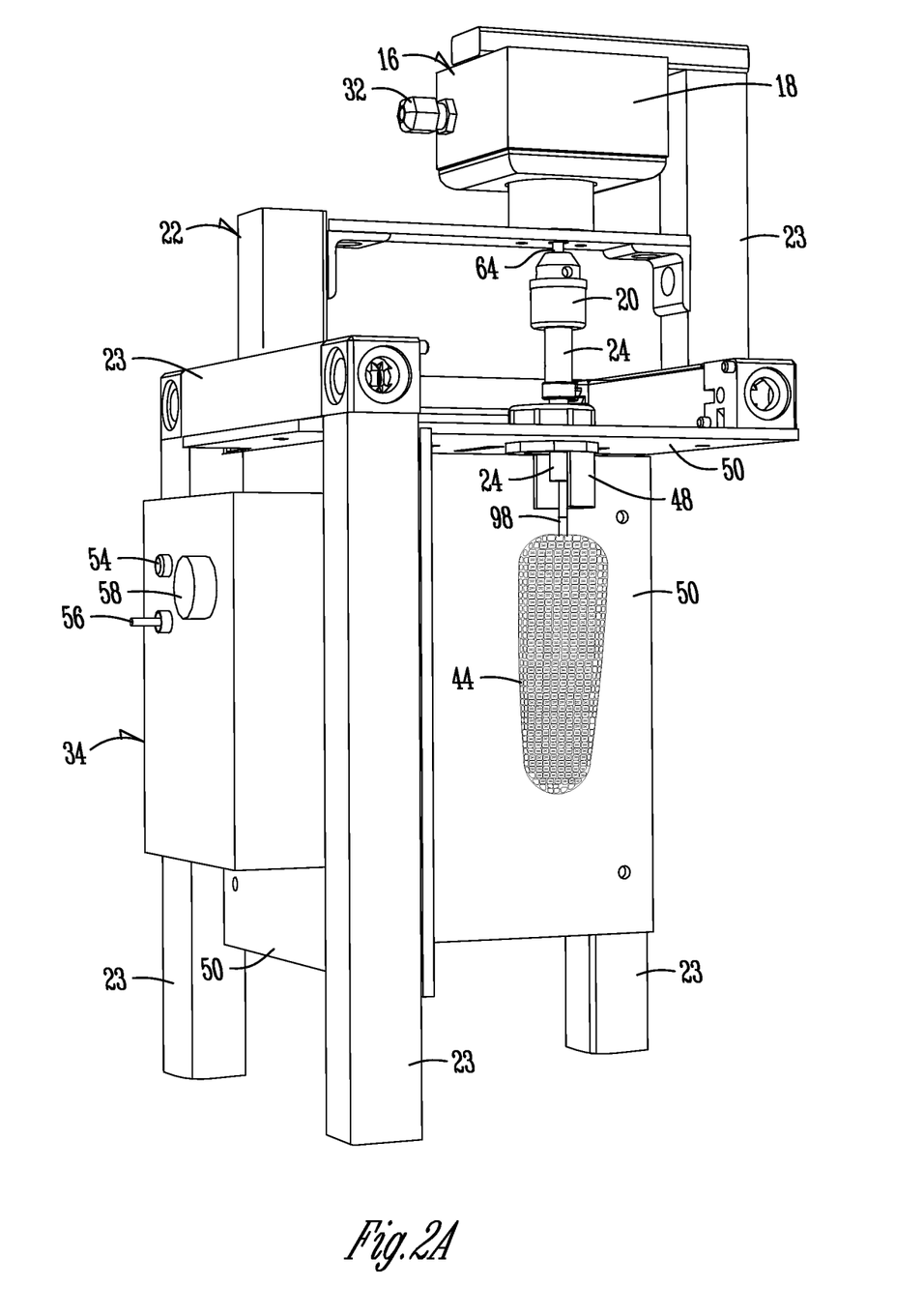
FIG. 2A is a perspective view of the motor and frame assemblies according to an exemplary aspect of the present invention.
Figure 2B:
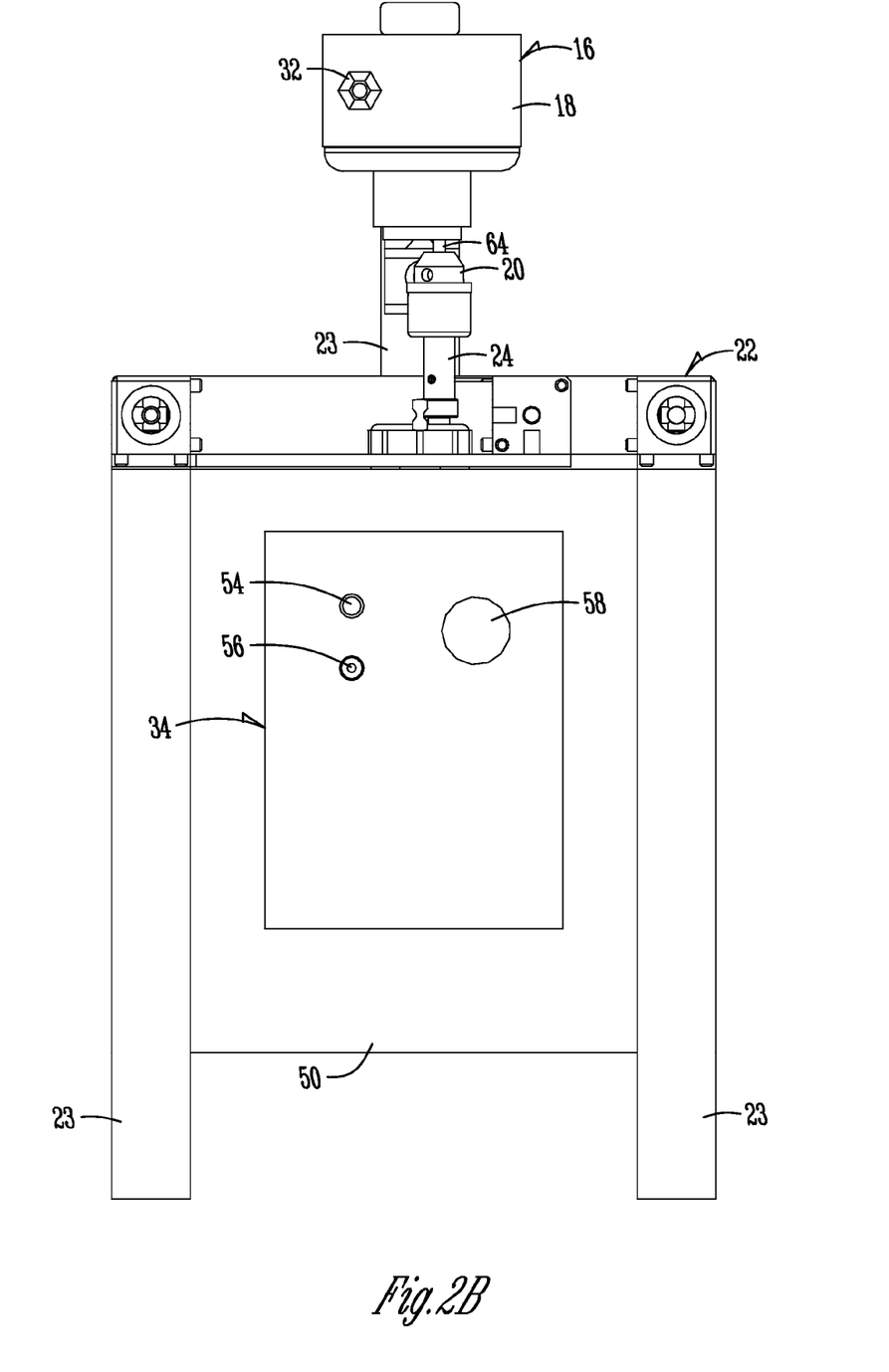
FIG. 2B is a front elevation view of the motor control box according to an exemplary aspect of the present invention.

Within workspace 14 is a motor assembly 16 as best illustrated in FIG. 2A. Motor assembly 16 is supported by frame assembly 22. Frame assembly 22 is comprised of a plurality of framing members 23 configured to support motor assembly 16 and one or more spray panels 50. Motor assembly 16 includes a motor 18 electrically connected to motor control box 34 by wire 32. Shaft 64 is rotated by motor 18 using motor control box 34. Motor control box 34, as best illustrated in FIG. 2B, includes a power switch 56 and a power indicator 54 to indicate when motor 18 is on. Motor control box 34 may include an rpm control knob 58 as well as a direction rotation switch (not shown) for controlling the rpm and direction of rotation of shaft 64 connected to motor 18. Those skilled in the art can appreciate that motor control box 34 can be powered by an electrical outlet or be hardwired into an electrical circuit. Motor assembly 16 could also be controlled by other control systems, such as a CPU or other electronic operating interfaces. Those skilled in the art can appreciate that the operating system could be electronic or manual and capable of being operated remotely or otherwise. The operating system could also include manual or electronic storage media for storing or recalling operating cycles or specifics relating to the processes performed to coat one or more ears of corn.

Attached to shaft 64 is grip 20. Grip 20 may be a commercially available drill chuck. Grip 20 holds grip guide 24. Grip guide 24 is preferably a screw guide, which is commercially available. For example, grip guide 24 could be a SEARS CRAFTSMAN SPEED-LOK Screw Guide. Most commercially-available screw guides include a magnetically active slot for receiving and retaining screws, bits, drills, and other like attachments. A screw 98 of appropriate size and length may be inserted into the socket portion of the screw guide 24 and retained there by magnetic attenuation. In the case where grip guide 24 is a screw guide and used with a desired screw 98, the screw 98 may be inserted into the cob portion of ear of corn 44 at a desired depth by rotating shaft 64 with motor 16. Because screw 98 is held within the socket of the screw guide 24, screw guide 24 holds an ear of corn 44 retained by screw 98. In this manner, ear of corn 44 can be secured to and rotated by grip 20. Although the one aspect for grip 20 and grip guide 24 have been described, those skilled in the art can appreciate that grip 20 and grip guide 24 could take on numerous configurations to secure ear of corn 44 thereto. For example, grip 20 and/or grip guide 44 could be configured to clamp about the cob or stem portion of an ear of corn to secure the ear of corn to the grip. In another aspect, grip 20 and/or grip guide 24 could be configured to secure an ear of corn to grip 20 by vacuum attachment means. In another exemplary aspect, grip 20 and/or grip guide 24 could be configured having a magnet within or without a socket for attracting a magnetically active material on or secured to an ear of corn. Even a nail, pin, spike(s) or rod could be used to pierce the cob to hang the ear of corn thereby. Those skilled in the art can appreciate that any gripping or retention means, whether piercing or non-piercing, capable securing, retaining or holding an ear of corn could be used to support the ear of corn in a position suitable for coating the ear of corn with any number of liquids, sprays, coatings, or the like. A coating shield 48 and spray panel 50 may be configured about grip guide 24 to prevent grip guide 24 and grip 20 from becoming coated and unworkable. For example, spray panel 50 could include an aperture for passing grip 20 and/or grip guide 24 therethrough or securing coating shield 48 thereto for protecting grip guide 24 and grip 20 from coating 96 being applied to ear of corn 44. Additional spray panels 50 may be attached to framing members 23 to capture any errant coating 96 or overspray resulting from coating ear of corn 44. Spray panels 50 could be vented or ported for evacuating or ventilating the space around ear of corn 44 being coated. The concepts of the present invention are not limited to a single grip, single station or single gripping/retention means for holding a single ear of corn at a time for applying a coating to the ear. Those skilled in the art can appreciate that several or even many grips could be configured within an enclosure so that any number of ears of corn could be coated simultaneously to make the process of coating ears of corn high throughput. Where multiple grips are configured into an enclosure, each could be turned by a single motor or a separate motor. Also, where single or multiple gripping positions are configured within an enclosure, one or more of these gripping positions could be staged so that one or more coating or coating types are being applied to the ears of corn. For example, an antifungal treatment could be applied to some of the ears of corn while others already having the antifungal treatment are coated with some other coating, such as an iron-based coating conducive for magnetic attenuation of the ear or individual seed.

Figure 4:
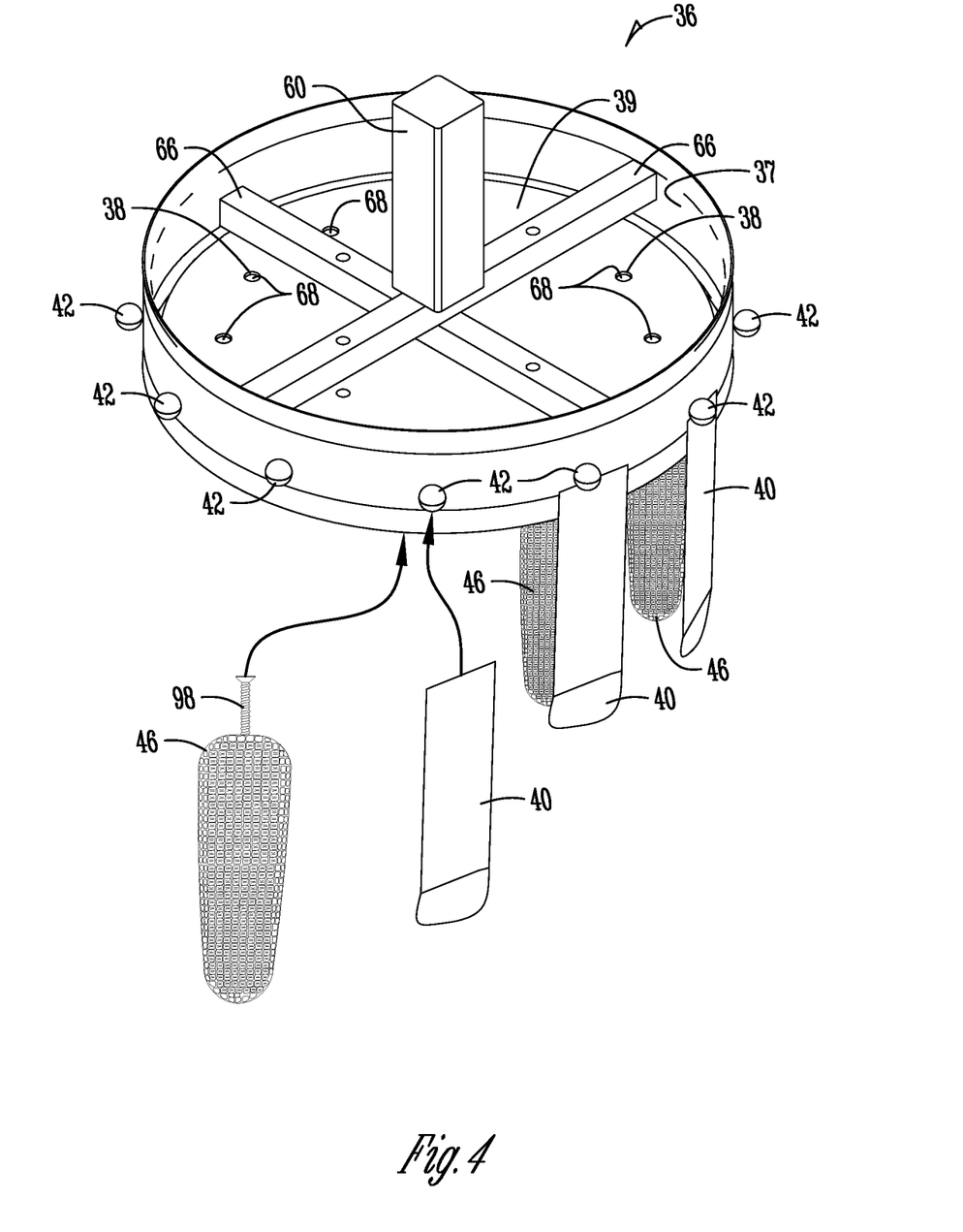
FIG. 4 is an isometric view of the drying rack assembly according to an exemplary aspect of the present invention.

Enclosure 12 also includes drying rack assembly 36. Drying rack assembly 36 may be attached to enclosure 12 by way of post member 60. Frame 66 is attached to post member 60 and adapted to rotate thereabout. Frame 66 supports and is attached to drying rack 37. Supported by drying rack 37 and/or frame 66 is support plate 39. Support plate 39 includes a plurality of drying positions 38. The drying positions 38 may be configured in support plate 39 in a radially-spaced manner or other configurations that would allow for optimization of the placement of drying positions 38 in support plate 39. Each drying position 38 includes a support means for hanging an ear of corn therefrom. The support means may include a magnet 68 as illustrated in FIG. 4 for attracting and securing a ferritic material coupled to the ear of corn 46 to each magnet 68 to hang ear of corn 46 thereby. Those skilled in the art can appreciate that numerous attachment means exist for securing ear of corn 44 to support plate 39. For example, hooks or clips could be configured at each drying position 38 in support plate 39 to secure ear of corn 44 so as to be supported in coating-conducive orientation, such as a vertical orientation by and relative to support plate 39. Those skilled in the art can appreciate that drying rack assembly 36 could be integrated with the coating process so that coated ears of corn move from the coating process into the drying process by a conveying means, such as a conveyor belt configured with multiple grips for securing multiple ears of corn. In this aspect, uncoated ears of corn could be retained at each gripping position on a conveyor belt, ran through the coating process and then drying process one or more times depending on the type, possible layering and/or number of coatings desired.

Associated with each drying position 38 is an identifier position 42 having means for attaching an identifier 40 thereto. The attaching means at each identifier position 42 can include a grip, clip or clamp as can be appreciated by those skilled in the art. The identifier 40 could include an envelope, sleeve, bag, or any like container with indicia thereon for identifying and tracking coated ear of corn 46 hanging in drying position 38 correlating or indexed with identifier position 42. The identifier 40 could also include any tag, label or marker having one or more markings such as a barcode or RFID to convey and/or track information about the ear of corn. The identifier 40 could be permanently or separably affixed to the ear of corn. For instance, the tag, label or marking may be banded or zip-tied to the ear of corn or attached by other like means known in the art. In the case where identifier 40 is separably affixed to the ear of corn, identifier 40 can be clipped to identifier position 42 to track each ear of corn throughout the painting and drying process. Each ear of corn 44 could be stored within or be associated with identifier 40 having information printed thereon for tracking, identifying, and indexing each ear of corn 44. The coated ear of corn 46 can be attached at drying position 38 correlating with identifier position 42 of the specific identifier 40 associated with ear of corn 46. Thus, each ear of corn 46 at each drying position 38 on drying rack 37 can be identified by an identifier 40 at a correlating identifier position 42 on drying rack 37.

Figure 3:
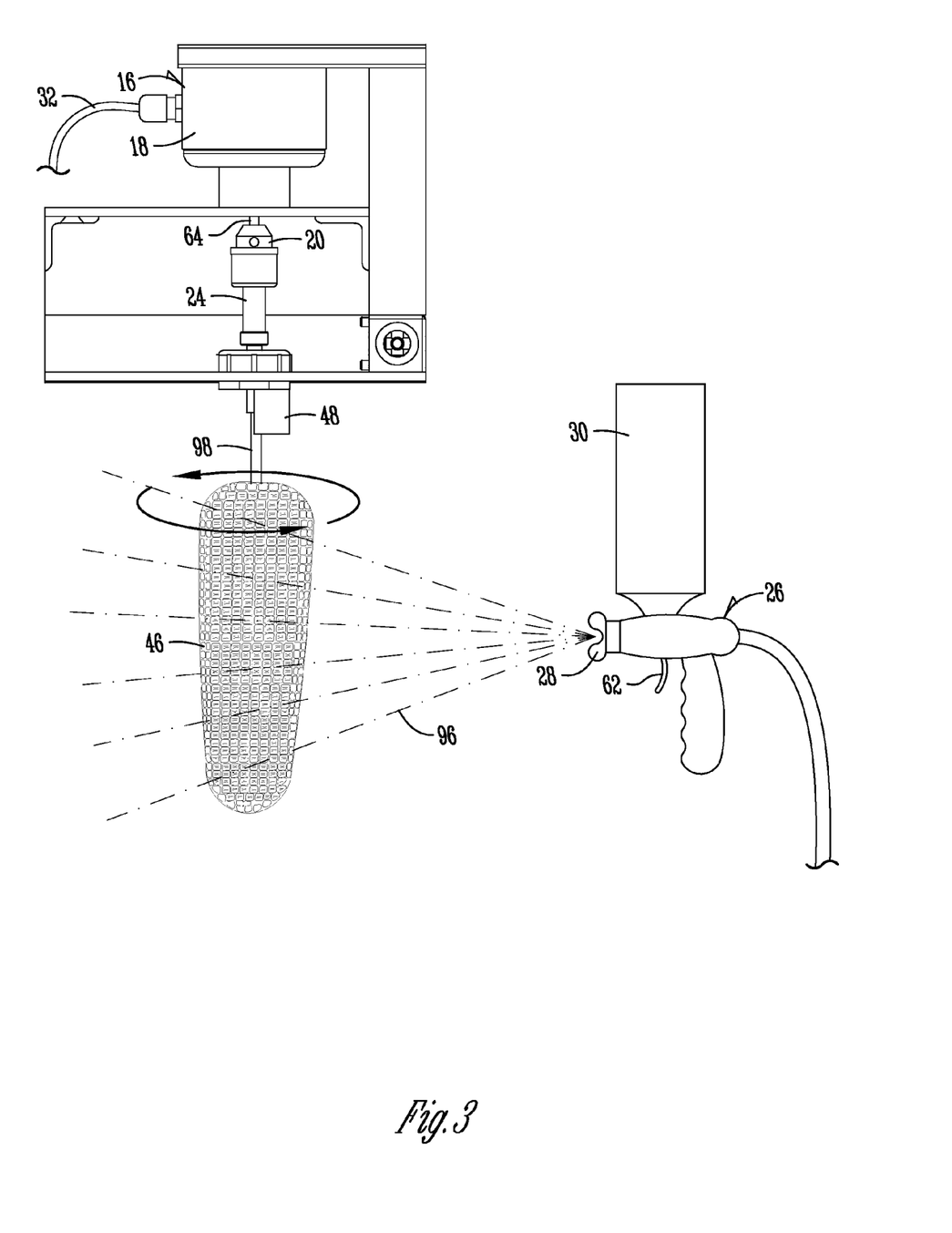
FIG. 3 is a perspective view of the coating applicator according to an exemplary aspect of the present invention.

Apparatus 10 also includes a coating applicator 26 moveable within workspace 14 to apply coating 96 to ear of corn 44 secured by grip 20. Those skilled in the art can appreciate that each ear of corn 44 could be moved relative to a fixed-position coating applicator 26 or coating applicator 26 may be moved relative to each ear of corn 44. Still, both coating applicator 26 and each ear of corn 44 could be moved simultaneously with respect to each other to increase operating/coating speeds. Coating applicator 26 can be a commercially-available paint gun having an adjustable nozzle 28, a reservoir 30 for housing and presenting a coating material at the nozzle 28 of the coating applicator 26 for dispensing. Likewise, coating applicator 26 may include a trigger 62 for releasing coating from coating applicator 26. Those skilled in the art can appreciate that coating applicator 26 may operate pneumatically, by gravity-feed, by siphon-feed, or other like means. Suffice it to say; coating applicators of varying type and construction are well known and commercially available. For example, an airbrush could be used to apply any number and type of coatings to an ear of corn. A coating applicator cradle 70 may be included within enclosure 12 for holding coating applicator 26 when not in use. Those skilled in the art can appreciate that nozzle 28 may be adjusted, and in fact, replaced with other nozzles, to control coating 96 sprayed from coating applicator 26. For example, nozzle 28 may be adjusted to control the thickness of coating 96 being applied to ear of corn 44. The present invention teaches coating ears of corn by manually operating coating applicator 26. It should be appreciated that the process of manually operating coating applicator 26 could be accomplished by a semi- or fully automated process. Coating applicator 26 could be moved relative to each ear of corn or each ear of corn to coating applicator 26 by any number of semi- or fully robotic means. The robotic means could be operated by motor control box 34 or remotely by some other means, such as a user interface or computer. The present invention contemplates other avenues of applying coatings than spraying. For example, a coating could be applied to each ear of corn by electrostatics, rolling on, brushing on, or dipping each ear in a coating. The present invention also contemplates applying coatings using primary or intermediary layers. For example, an adhesive coating could be first applied then followed by a secondary functional layer, such as an iron particle coating.

Method

Figure 5A:
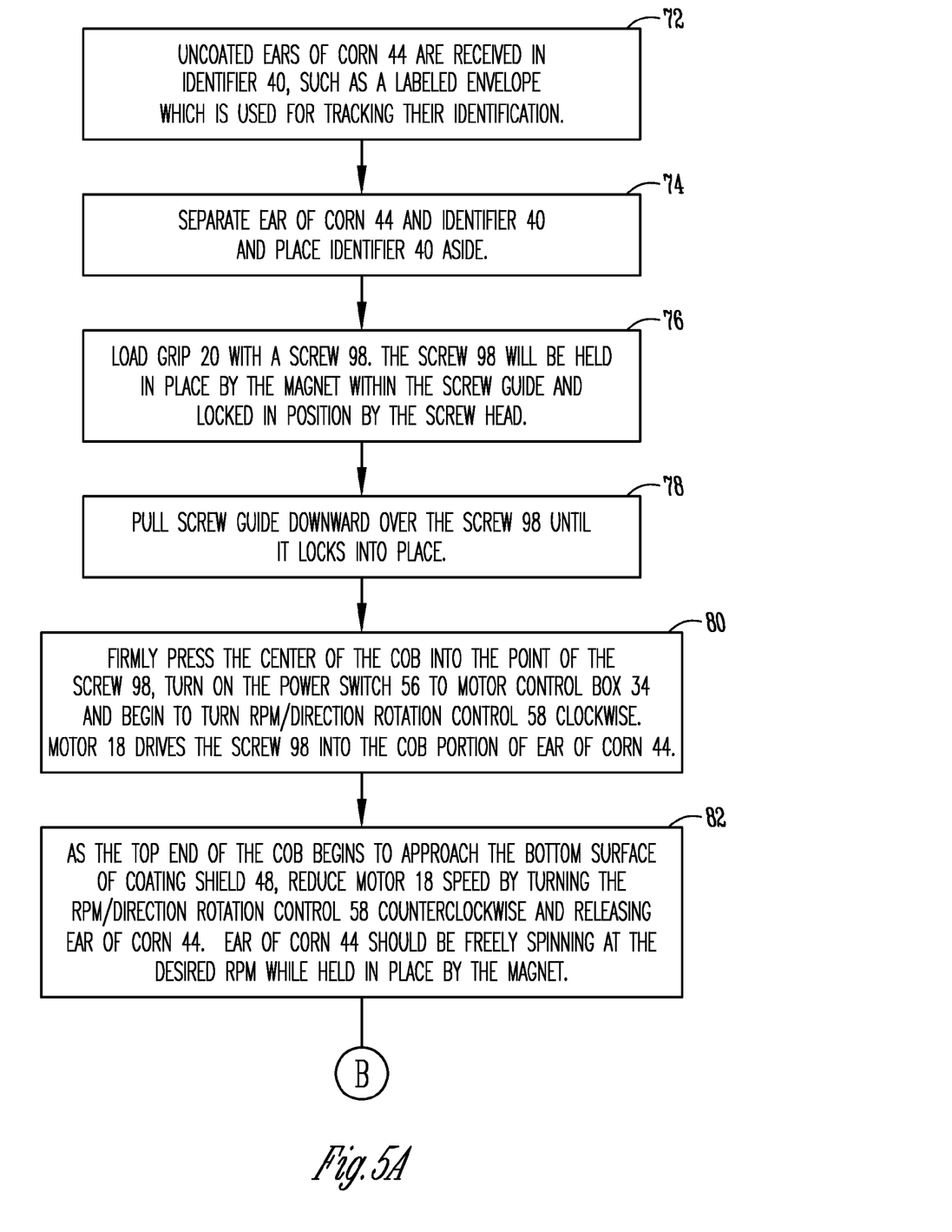
FIG. 5A is a flow diagram of the steps for applying a coating to an ear of corn with the apparatus according to an exemplary aspect of the present invention.
Figure 5B:
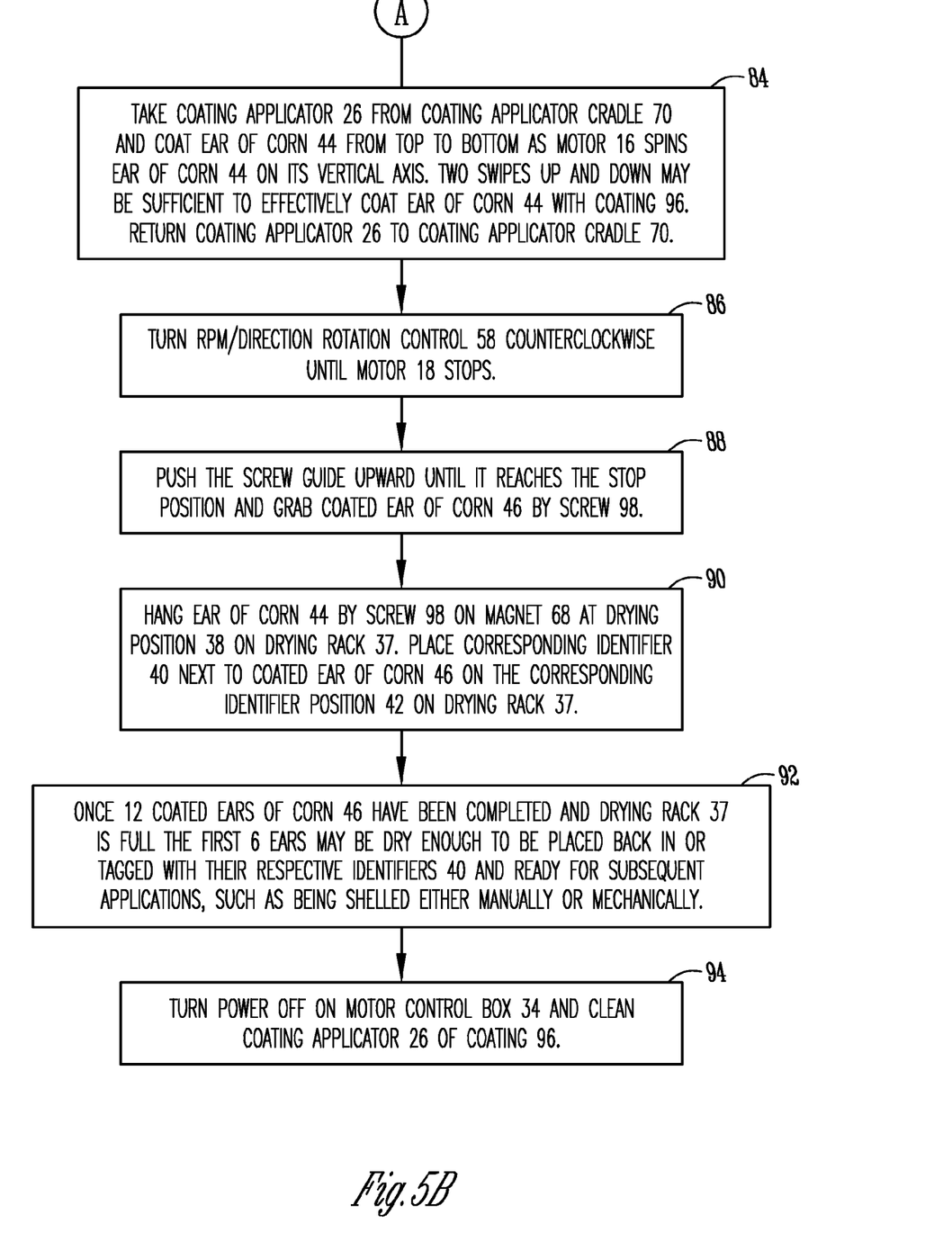
FIG. 5B is a continuation of the flow diagram shown in FIG. 5A.

Also disclosed by the present invention are methods for coating ear of corn 44. According to an exemplary method of the present invention, ear of corn 44 may be received and removed or separated from identifier 40 having information associated therewith for tracking, indexing, and correlating ear of corn 44 with identifier 40 as indicated in step 72 of FIG. 5A. Identifier 40 may be set aside, as discussed in step 74 and ear of corn 44 may be positioned relative to grip 20. A screw 98 of desired length and size is inserted into the screw guide, as discussed further in step 76, in the case where screw 98 is being used to secure ear of corn 44 to grip 20. Using a commercially-available screw guide, the screw is loaded and held in place by a magnet within the screw guide and locked in position by the head on screw 98, according to step 78. For example, in the case of where a slotted hex head screw is used, the hex head screw is retained within the screw guide by the magnet and locked in position by the hex head so as to rotate when the screw guide is rotated. Those skilled in the art can appreciate that numerous types of screws, not limited to a slotted hex head screw, could be used to secure ear of corn 44 to a screw guide. Even a nail, pin, spike(s) or rod could be used to pierce the cob to hang the ear of corn thereby. Those skilled in the art can appreciate that any gripping or retention means, whether piercing or non-piercing, capable securing, retaining or holding an ear of corn could be used to support the ear of corn in a position suitable for coating the ear of corn with any number of liquids, sprays, coatings, or the like. Once screw 98 is positioned within screw guide, the ear of corn 44 may be firmly pressed against screw 98 so that the point of screw 98 pierces the center of the ear of corn at the cob portion as further discussed in step 80. With power switch 56 in the on position, turning rpm control 58 activates motor 18 causing grip 20 to rotate so as to drive screw 98 within the screw guide 24 into the cob portion of ear of corn 44. Screw 98 may then be inserted into ear of corn 44 to a desired depth such that ear of corn 44 is firmly secured to screw 98 so as to be rotatable by motor 18 as spoken to also in step 82. Although screw 98 is disclosed for securing ear of corn 44 to grip 20, those skilled in the art can appreciate that numerous attachment means exist for attaching ear of corn 44 to grip 20. For example, ear of corn 44 could be attached to grip 20 by clamping grip 20 about ear of corn 44, vacuum attaching ear of corn 44 to grip 20, or magnetically-attaching ear of corn 44 to grip 20 by some other means other than screw 98, such as another magnetically-active material secured to ear of corn 44 and attracted to grip 20. With ear of corn 44 securely attached to grip 20, the rpm control 58 may be moved to a desired rpm for spinning ear of corn 44 as discussed further in step 82. With ear of corn 44 spinning, coating applicator 26 may be used to apply a coating 96 of magnetically-active material or some other desirable coating to ear of corn 44. Because ear of corn 44 can be spun at a controlled rpm, coating 96 can be applied with coating applicator 26 as ear of corn 44 spins on its vertical axis or the axis of the cob portion of ear of corn 44. Those skilled in the art can appreciate that coating applicator 26 may operate pneumatically, by gravity-feed, by siphon-feed, or other like means. Suffice it to say; coating applicators of varying type and construction are well known and commercially available. For example, an airbrush could be used to apply any number and type of coatings to an ear of corn. Ear of corn 44 is coated with a desired coating, such as a magnetically-active coating, using coating applicator 26 as discussed further in step 84. Those skilled in the art can appreciate that each ear of corn 44 could be moved relative to a fixed-position coating applicator 26 or coating applicator 26 may be moved relative to each ear of corn 44. Still, both coating applicator 26 and each ear of corn 44 could be moved simultaneously with respect to each other to increase operating/coating speeds. Depending on the desired thickness of coating 96 being applied to ear of corn 44, the nozzle 28 of coating applicator 26 or rpm may be adjusted so that the coating thickness on ear of corn 44 is increased, remains the same, or decreased. These same parameters may be adjusted depending on the type of coating being used to coat ear of corn 44. For example, if the coating has a higher or lower viscosity the nozzle 28, air pressure to applicator 26, and rpm of motor 18 may be adjusted appropriately. The concepts of the present invention are not limited to a single grip, single station or single gripping/retention means for holding a single ear of corn at a time for applying a coating to the ear. Those skilled in the art can appreciate that several or even many grips could be configured within an enclosure so that any number of ears of corn could be coated simultaneously to make the process of coating ears of corn high throughput. Where multiple grips are configured into an enclosure, each could be turned by a single motor or a separate motor. Also, where single or multiple gripping positions are configured within an enclosure, one or more of these gripping positions could be staged so that one or more coating or coating types are being applied to the ears of corn. For example, an antifungal treatment could be applied to some of the ears of corn while others already having the antifungal treatment are coated with some other coating, such as an iron-based coating conducive for magnetic attenuation of the ear or individual seed. The rpm control 58 can be adjusted to stop ear of corn 44 from rotating to be removed from grip 20, as further discussed in step 86. The coated ear of corn 46 may be removed from grip 20 by separating screw 98 from the screw guide, as taught in step 88. The coated ear of corn 46 may then be transferred to the drying rack assembly 36 for drying. For example, the coated ear of corn 46 may be hung and supported at drying position 38 by magnet 68, as further discussed in step 90. Those skilled in the art can appreciate that drying rack assembly 36 could be integrated with the coating process so that coated ears of corn move from the coating process into the drying process by a conveying means, such as a conveyor belt configured with multiple grips for securing multiple ears of corn. In this aspect, uncoated ears of corn could be retained at each gripping position on a conveyor belt, ran through the coating process and then drying process one or more times depending on the type, possible layering and/or number of coatings desired. The corresponding identifier 40 may be hung at the correlating identifier position 42 to drying position 38 to identify the coated ear of corn 46. Once the coated ear of corn 46 is sufficiently dry, the coated ear of corn 46 may be tagged with or put inside identifier 40 so that the coated ear of corn 46 is indexed and correlates with identifier 40. The identifier 40 could also include any tag, label or marker having one or more markings such as a barcode or RFID to convey and/or track information about the ear of corn. The identifier 40 could be permanently or separably affixed to the ear of corn. For instance, the tag, label or marking may be banded or zip-tied to the ear of corn or attached by other like means known in the art. In the case where identifier 40 is separably affixed to the ear of corn, identifier 40 can be clipped to identifier position 42 to track each ear of corn throughout the painting and drying process. Those skilled in the art can appreciate that because drying rack 36 has a plurality of drying positions 38, several coated ears of corn 46 may be drying while each ear of corn 44 is having coating 96 applied to its outer surface, as further discussed in step 92. Dried, coated ears of corn 46 may be rotated out and included with identifier 40 as freshly coated ears of corn 46 are positioned on drying rack assembly 36 for drying with their corresponding identifier 40 to increase the throughput of coating each ear of corn 44 using apparatus 10. When the desired coating has been applied, the power switch 56 can be turned off and the coating applicator 26 cleaned, as further taught in step 94. The present invention teaches coating ears of corn by manually operating coating applicator 26. It should be appreciated that the process of manually operating coating applicator 26 could be accomplished by a semi- or fully automated process. Coating applicator 26 could be moved relative to each ear of corn or each ear of corn to coating applicator 26 by any number of semi- or fully robotic means. The robotic means could be operated by motor control box 34 or remotely by some other means, such as a user interface or computer. The present invention contemplates other avenues of applying coatings than spraying. For example, a coating could be applied to each ear of corn by electrostatics, rolling on, brushing on, or dipping each ear in a coating. The present invention also contemplates applying coatings using primary or intermediary layers. For example, an adhesive coating could be first applied then followed by a secondary functional layer, such as an iron particle coating.

The embodiments of the present invention have been set forth in the drawings and specification and although specific terms are employed, these are used in a generically descriptive sense only and are not used for the purposes of limitation. Changes in the formed proportion of parts, as well as in the substitutions of equivalences are contemplated as circumstances may suggest or are rendered expedient without departing from the spirit and scope of the invention as further defined in the following claims.

What is claimed is:

1. A method for applying a coating to an ear of corn, comprising:
    providing an enclosure defining a user accessible workspace housing a motor assembly having a motor connected to a grip;
    releasably securing an ear of corn to the grip;
    rotating the ear of corn with the motor; and
    spraying a magnetically active coating on the ear of corn with a coating applicator.

2. The method of claim 1 wherein the step of releasably securing the ear of corn to the grip includes:
    a. fastening a screw to the ear of corn using the grip;
    b. clamping the grip about the ear of corn;
    c. vacuum attaching the ear of corn to the grip; or
    d. magnetically attaching the ear of corn to the grip.

3. The method of claim 1 further comprising a step of guiding a screw into the ear of corn with a grip guide to secure the ear of corn to the grip.

4. The method of claim 1 further comprising a step of removably securing a coated ear of corn at a drying position on a drying rack for drying the coating.

5. The method of claim 4 further comprising a step of correlating the ear of corn and coated ear of corn with an identifier associated with the ear of corn and each drying position to track and identify the ear of corn before and after coating.

6. The method of claim 1 wherein the magnetically active coating is configured to allow kernels removed from the ear of corn to be magnetically oriented in other applications.

7. A method for applying a coating to an ear of corn, comprising:
    providing a ventilated enclosure defining a user accessible workspace for housing a motor assembly having a motor connected to a grip, a coating applicator and a drying rack;
    separating the ear of corn from an identifier having information to identify and track the ear of corn;
    securing the ear of corn to the motor with the grip;
    rotating the ear of corn with the motor;
    spraying the ear of corn with the coating applicator so as to coat the ear of corn with a magnetically active coating; and drying the coated ear of corn at a drying position on the drying rack correlated with the identifier.

8. The method of claim 7 further comprising a step of securing the identifier to the drying rack proximate one drying position to correlate the drying position with the coated ear of corn.

9. The method of claim 8 further comprising a step of attaching the coated ear of corn at the drying position with the identifier correlating to the ear of corn.

10. The method of claim 7 wherein the separating step includes:
   a. removing the ear of corn from an envelope having information for tracking and identifying the ear of corn;
   b. removing the ear of corn from a sleeve having information for tracking and identifying the ear of corn;
   c. removing the ear of corn from a bag having information for tracking and identifying the ear of corn;
   d. removing the ear of corn from a container having information for tracking and identifying the ear of corn.
   e. detaching the ear of corn from a barcode having information for tracking and identifying the ear of corn;
   f. detaching the ear of corn from an RFID having information for tracking and identifying the ear of corn; or
   g. detaching the ear of corn from a label having information for tracking and identifying the ear of corn.

11. The method of claim 10 further comprising a step of correlating the coated ears of corn with the envelope, sleeve, bag, barcode, RFID, label, or a container correlating to the ear of corn after drying the ear of corn.

12. The method of claim 7 further comprising a step of binding a ferritic material to a cob portion of the ear of corn.

13. The method of claim 12 further comprising a step of magnetically attaching the ear of corn to the grip using the ferritic material on the ear of corn to secure for rotating and to the drying position on the drying rack for drying.

14. A method for applying a coating to an ear of corn, comprising:
   providing an enclosure defining a user accessible workspace housing a grip and a coating applicator;
   securing an ear of corn to the grip; and
   spraying a magnetically active coating on the ear of corn with a coating applicator.

15. The method of claim 14 further comprising a step of rotating the grip with a motor to rotate the ear of corn about the coating applicator to coat the ear of corn.

16. The method of claim 14 further comprising a step of rotating the coating applicator about the grip having the ear of corn to coat the ear of corn.

* * * * *